United States Patent
Sonnier et al.

(10) Patent No.: US 12,000,269 B2
(45) Date of Patent: Jun. 4, 2024

(54) METHOD AND SYSTEM FOR MONITORING, COMMUNICATING AND CONTROLLING COMPLETION RELATED OPERATIONS

(71) Applicant: McCoy Global Inc., Edmonton (CA)

(72) Inventors: Gareth Dustin Sonnier, Austin, TX (US); Bing Deng, Edmonton (CA); Richard Chism, Round Rock, TX (US); Andrei Dmitriev, Edmonton (CA)

(73) Assignee: MCCOY GLOBAL INC., Edmonton (CA)

( * ) Notice: Subject to any disclaimer, the term of this patent is extended or adjusted under 35 U.S.C. 154(b) by 595 days.

(21) Appl. No.: 16/839,445

(22) Filed: Apr. 3, 2020

(65) Prior Publication Data

US 2020/0318474 A1 Oct. 8, 2020

Related U.S. Application Data

(60) Provisional application No. 62/829,780, filed on Apr. 5, 2019.

(51) Int. Cl.
*G06F 11/30* (2006.01)
*E21B 47/12* (2012.01)
(Continued)

(52) U.S. Cl.
CPC ............ *E21B 47/12* (2013.01); *G05B 13/024* (2013.01); *G05B 13/0265* (2013.01); *G06N 7/01* (2023.01); *G06N 20/00* (2019.01); *H04L 67/12* (2013.01)

(58) Field of Classification Search
CPC ...................................................... E21B 47/12
See application file for complete search history.

(56) References Cited

U.S. PATENT DOCUMENTS 6,896,055 B2   5/2005  Koithan
8,413,525 B1   4/2013  Schultz et al.
(Continued)

FOREIGN PATENT DOCUMENTS

WO        200225319 A2    3/2002

OTHER PUBLICATIONS

"Machine Learning streamlines tubular connection analysis" Oil & Gas Engineering (www.oilandgaseng.com, Jan. 15, 2019.
(Continued)

*Primary Examiner* — Phuong Huynh
(74) *Attorney, Agent, or Firm* — FIELD LLP

(57) ABSTRACT

A method is provided for remote monitoring, decision making and operation of one or more parameters of on-site well operation equipment. The method includes collecting data corresponding to the at least one parameter by one or more on-site sensor modules assigned to the equipment for monitoring joint make-up of tubing and casing connections; transmitting the collected data to an on-site make-up monitoring system; transmitting said collected data from the on-site make-up monitoring system to a cloud or edge-based system for storage, display and analysis; accessing collected day by one or more users via one or more dedicated remote portals for review or analysis; and transmitting instructions from any one or more users via the remote portal and cloud or edge-based system back to the on-site make-up monitoring system for modifying the operation of the equipment within predefined limits. A system for remote monitoring, decision making and operation of one or more parameters of on-site well operation equipment is further provided as well as a calibration system and a calibration method for calibrating mechanized well operation equipment.

2 Claims, 9 Drawing Sheets

(51) Int. Cl.
*G05B 13/02* (2006.01)
*G06N 7/01* (2023.01)
*G06N 20/00* (2019.01)
*H04L 67/12* (2022.01)

(56) References Cited

U.S. PATENT DOCUMENTS

| | | |
|---|---|---|
| 9,097,070 B2 | 8/2015 | Hunter |
| 9,453,377 B2 | 9/2016 | Mosing et al. |
| 2005/0096846 A1 | 5/2005 | Koithan et al. |
| 2005/0161260 A1 | 7/2005 | Koithan et al. |
| 2016/0053605 A1* | 2/2016 | Abbassian ............. G05B 15/02 702/6 |
| 2017/0159381 A1 | 6/2017 | Orban |

OTHER PUBLICATIONS

"Gen II System Layout" AllTorque Control Systems (www.alltorque.ca).

"Service Plan with the AllTorque Cloud" AllTorque Control Systems (www.alltorque.ca).

"Display(TM) Digital Application" Frank's International (www.franksinternational.com).

\* cited by examiner

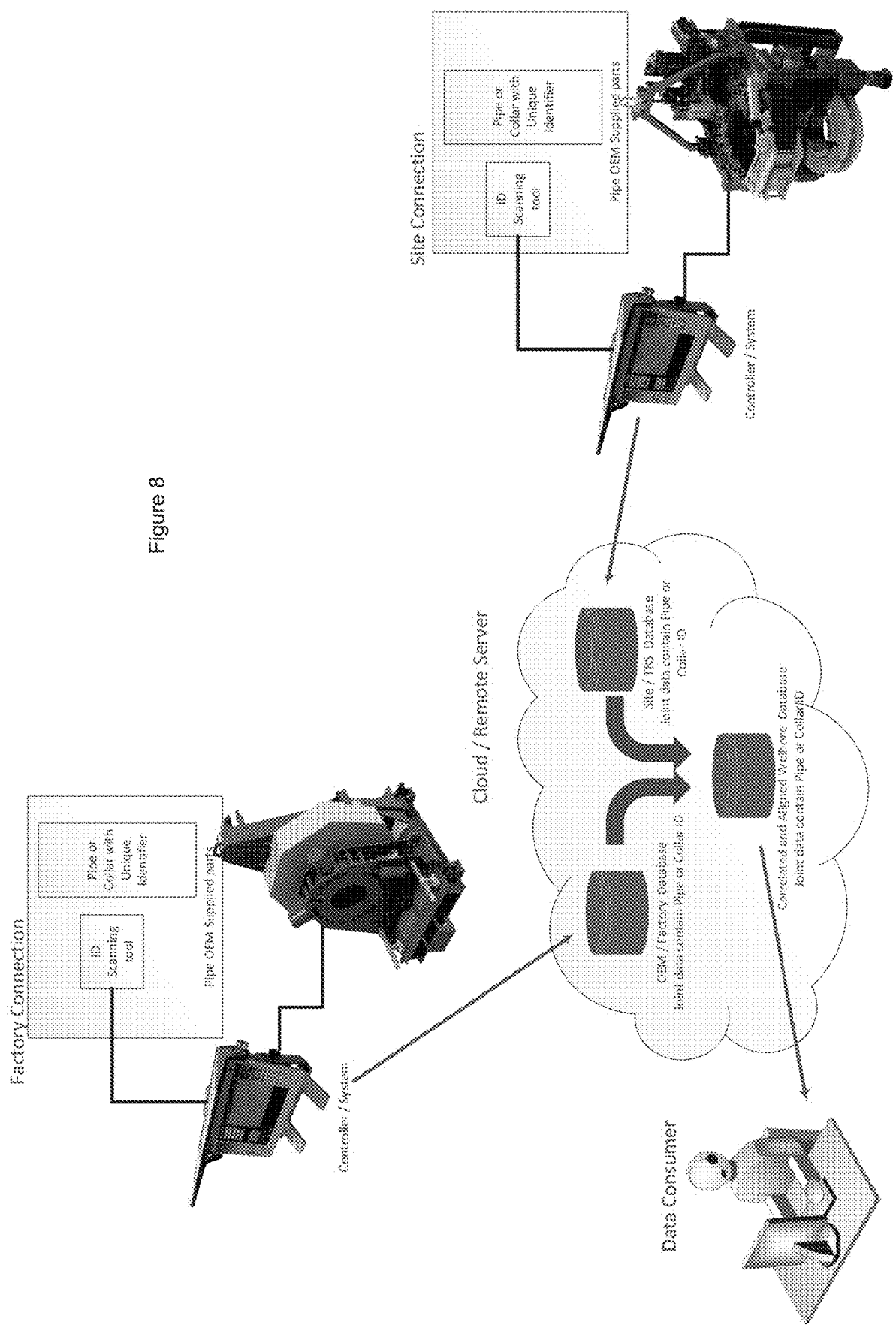

METHOD AND SYSTEM FOR MONITORING, COMMUNICATING AND CONTROLLING COMPLETION RELATED OPERATIONS

FIELD

The present disclosure relates to methods and systems for remote monitoring, decision making, communicating and operating of well completions.

BACKGROUND

After an oil or gas well has been drilled, the well is completed by progressively threading and running downhole, sections of tubular to form a tubular string in the well bore. Tubular sections often come from the manufacturer with a coupling/collar piece already connected at one end. During tubular make-up, the pin end of one section of tubular is threaded into the coupling/collar of another tubular to create series of tubular joints that are then lowered down the wellbore for the purposes of maintaining wellbore integrity for operational extraction of oil or gas from the wells.

The integrity of the tubular connections is important to down hole operations, as well as avoiding over-tightening or damaging the tubular sections. There must therefore be a means for measuring make-up parameters and determining satisfactory tubular make-up, engagement and seal. Manufacturers of premium grade connections provide a range of torque values and other parameters for proper make-up of specific connections. These parameters can be compared against measured parameters, which can then be plotted against number of turns, along with visual inspection of the connection by the operator, to monitor the connection and determine make-up acceptability.

During the tubular installation, there is a requirement to monitor and record the thread make-ups to ensure that the connection joints match the connection profile provided from the tubular manufacturers. The forces being applied to the tubular joint are measured and recorded using various sensors. The sensor data is presented graphically to the operator on-site to review and to determine satisfactory make-up of the joint before it is lowered into the well.

These sensors can be installed on any make-up or break out unit, including but not limited to a bucking units, tongs, casing running tools (CRT), etc. depending on whether a connection is made at a factory, completions facility or on the well site.

The real-time collection and dissemination of rotational and torque parameters during make-up is a crucial aspect to acceptable make-up determination. It is important to be able to make an assessment of the tubular string make-up in real time during the make-up process.

Another challenge is having the correct level of support available on-site to make the proper decision on the quality of the connection made. Proper make-up of tubulars is crucial to the integrity of production operations. Make-up experts from the tubular manufacturer are typically needed to be on site to review real time make-up data with the operator and confirm that a tubular connection has been made up satisfactorily. The need for the on-site presence of the make-up expert, often known as a "thread representative," adds considerable costs and logistics to make-up operations, particularly those in remote locations.

There is often also a desire on the part of the tubular manufacturer to make use of connection make-up data on-site and collate it with the manufacturer's make-up data, so, make-up data of the tubular to its collar can be analyzed for pass/fail by utilizing algorithms for connecting factory records with field operations.

There is a need to develop improved devices and systems for more accurately transmitting data in real time during tubular make-up and drilling with tubular operations. There is also a need for remote third parties to be able to communicate with operators on-site to make decisions on tubular make up.

SUMMARY

In a first aspect, the present disclosure provides a method for remote monitoring, decision making and operation of one or more parameters of on-site well operation equipment, comprising:
i) collecting data corresponding to the one or more parameters by one or more on-site sensor modules assigned to the on-site well operation equipment for monitoring joint make-up of tubing and casing connections;
ii) transmitting the collected data to an on-site make-up monitoring system;
iii) transmitting said collected data from the on-site make-up monitoring system to a cloud or edge-based system for storage, display and analysis;
iv) accessing collected day by one or more users via one or more dedicated remote portals for review or analysis; and
v) transmitting instructions from any one or more of the one or more users via the remote portal and the cloud or edge-based system back to at least the on-site make-up monitoring system for modifying the operation of the well operation equipment within predefined limits.

In a further embodiment, a method is provided for remote monitoring, decision making and operation of one or more parameters of on-site well operation equipment, comprising:
i) collecting data corresponding to the at least one parameter by on-site sensor modules assigned to the well operation equipment for monitoring joint make-up of tubing and casing connections;
ii) transmitting the collected data to an on-site make-up monitoring system;
iii) transmitting said collected data from the on-site make-up monitoring system to a cloud or edge-based system for analysis; and
iv) transmitting instructions from the cloud or edge-based system back to at least the on-site make-up monitoring system for modifying the operation of the well operation equipment within predefined limits.

A system for remote monitoring, decision making and operation of one or more parameters of on-site well operation equipment is further provided comprising:
i) an on-site make-up monitoring system connected to an on-site sensor module of the mechanized well operation equipment for receiving and processing sensor data from the on-site sensor module; and
ii) a cloud or edge-based system, remotely accessible by one or more users via dedicated remote portals, said cloud or edge-based system being connected with said on-site make-up monitoring system for storing, displaying and analyzing received data and for communicating decisions to the on-site make-up monitoring system for operation of the on-site mechanized well operation equipment.

The present disclosure also provides a calibration system for mechanized well operation equipment, comprising:
  i) an on-site make-up monitoring system connected to an on-site sensor module of the mechanized equipment, for receiving and processing sensor data; and,
  ii) a cloud or edge-based system connected with said on-site make-up monitoring system and comprising cloud or edge-based predictive calibration algorithms for analyzing sensor data;
wherein the cloud or edge-based algorithms provide output metrics with limits for statistical confidence and increased certainty that sensor data align with the calibration state of the equipment during operation.

A calibration method is also provided for mechanized well operation equipment, comprising:
  i) installing and initially calibrating the equipment
  ii) collecting calibration and operation data from the equipment via an on-site make-up monitoring system
  iii) transmitting said data to a cloud or edge-based system;
  iv) recalibrating equipment to confirm initial calibration validity;
  v) performing via a cloud or edge-based system applied machine learning to validate calibration;
  vi) updating an applied machine learning model with updated machine learning coefficients; and
  vii) activating the model to provide calibration indicators with respect to the well operation equipment operation.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings:

FIG. 8 is a schematic diagram of one example of the present system for use in correlating factory tubular connection data with site connection data to produce a consolidated wellbore construction report.

The drawings are not necessarily to scale and in some instances, proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

Figure 3:
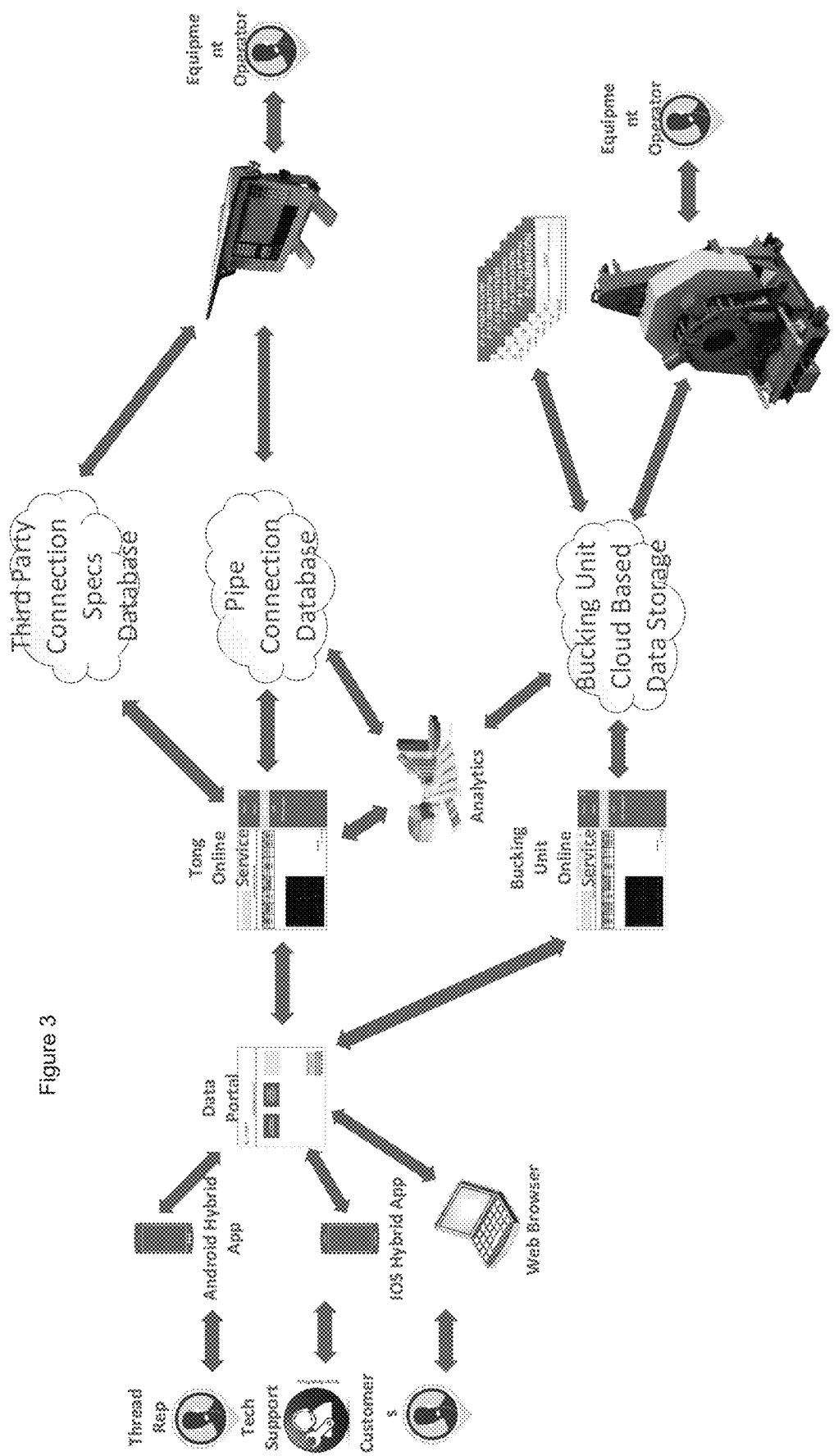
FIG. 3 is a schematic diagram of an overview of one example of the entire system of the present disclosure.

The present disclosure relates firstly to system that can be used with any number of torque turns make-up system used to make-up tubular joints. One example of this system is illustrated in FIG. 3.

The equipment that can be used with the present system include bucking units, tubular running tools and tongs which can be connected to the present system via an onsite make-up monitoring system, such that data from the equipment and from the make-up operation can be provided from the on-site make-up monitoring system to the present system in real-time and remotely viewed by relevant parties for decision making to support joint make-up.

Instructions and communication from remote parties can also be received through the present system and remote decision making and even operation of the equipment via communication with the on-site make-up monitoring system is also possible by input from authorized third parties.

The system can support network connectivity via satellite, cellular connection, ethernet, or any other known means in the art, to support uplink of data in real-time to the cloud or edge-based storage.

The present system can be connected to the cloud or to edge-based system services to allow for raw connection data to be collected via communication with the on-site make-up monitoring system for one or more make-up applications. In this way the present system provides an industrial internet of things (IIOT) solution to make-up equipment. For the purposes of the present disclosure, the cloud is understood to refer to data centers available over a network, used to handle and distribute functions over multiple locations from central servers. The cloud thus forms an on demand availability of computer system resources, especially data storage and computing power, without direct active management by the user. In cases where the cloud connection to the user is relatively close, it may be designated an edge server, or edge-based system.

The present cloud connected system has the ability to provide real time review, decision making and operation from any number of remote users at different locations on each connection made, using cloud or edge processing, based on an algorithm defined for each piece of equipment being used in make-up operations. The system is preferably supported by local edge storage and offer "real time" synching capability when a network connection is available.

Remote Access Portal

With reference to FIG. 3, the present system is preferably presented on a cross platform portal accessible by any number of applications, including but not limited to web, IOS and Android applications will provide access and security for all users. It would be understood by a person of skill in the art that the present system does not need to be device or operating system limited. The present system can be supported on a platform that can provide an online point of access for all related users and services.

The portal will include administrative and/or user self-registration for easy account management, the ability to set up organizations within an account, organizational account management with permission controls for users, the ability for the customer to add and delete services and secure access.

Users of the platform can include the company owning the drilling rig and performing drilling of the well, the company conducting the make-up and casing operation, completions operators, pipe manufacturer and their thread representatives, the well owners, the production company and any of their respective staff. Users can be local on-site of the completion operation, or they can be remotely located. Certain users will also have the ability to share remote access with others, thereby providing a one-to-many relationship with the data.

Figure 1:
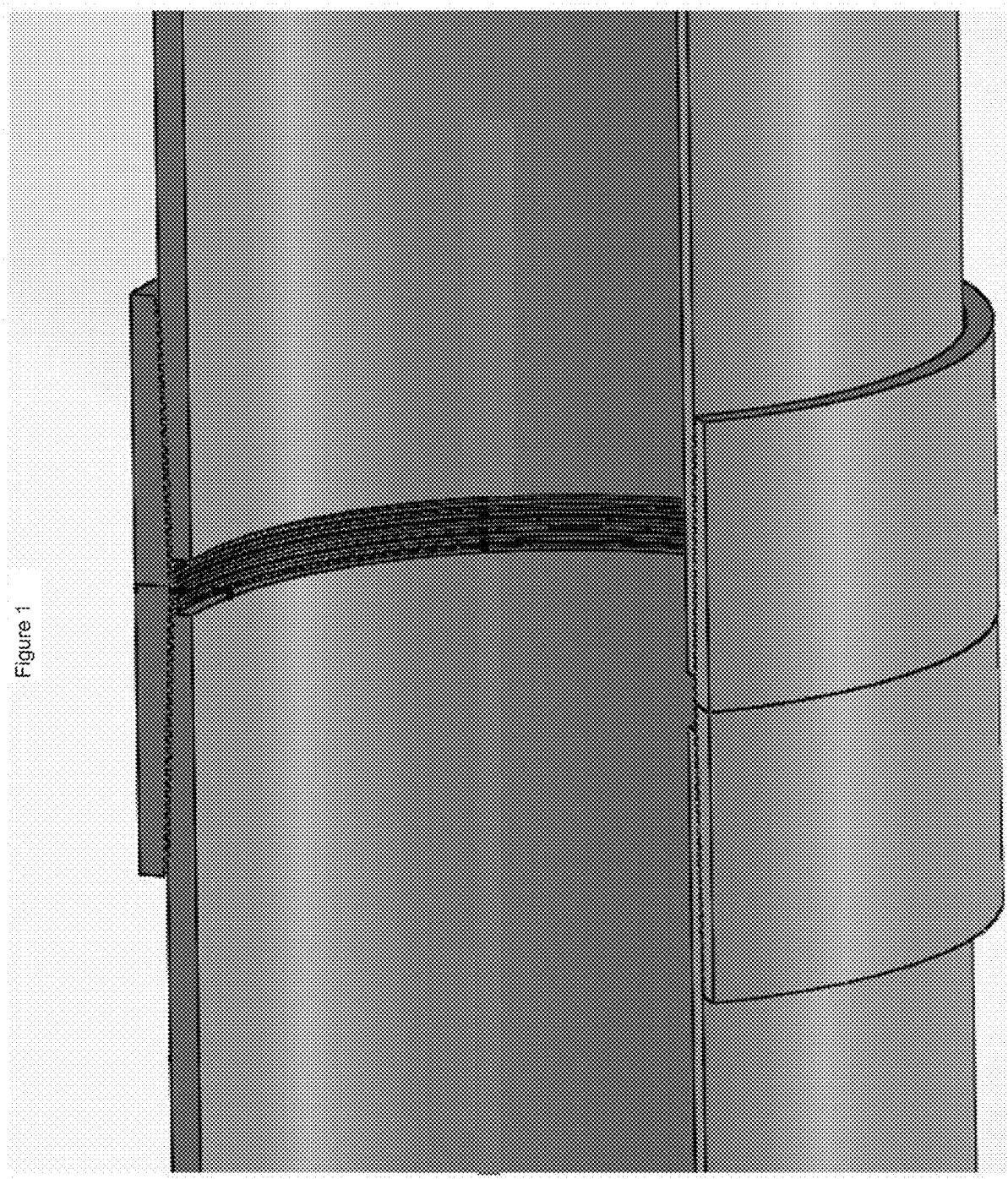
FIG. 1 is one example of a tubular connection with which the present disclosure would be used.
Figure 2:
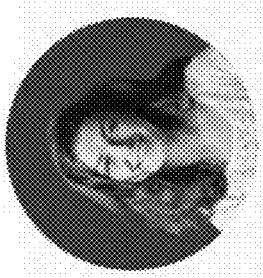
FIG. 2 illustrates one example of an operator performance statistics application of the present disclosure.

The portal will also provide the online service module support for a remote thread representative capability. Users of the system via the portal will include operators both on site and remotely, technical support from the equipment manufacturer, thread experts from the tubular manufacturer, consultants, among others. Operator performance With reference to FIG. 2, the present cloud connected system can potentially also maintain historical performance information on operators including and overall rating and reviews, which can be called up on demand. This information can be accessed by any number of entities including management who employ the operator, companies making the tubular handling equipment, remote or virtual thread representatives from the tubular manufacturing company and even the operator herself/himself.

An operator and groups shared with the operator can see ratings and performance statistics about the operator. The aggregation of user specific data and performance could include certifications, training, along with connection experience and other job-related experience for the operator.

Remote Thread Representative

Figure 4:
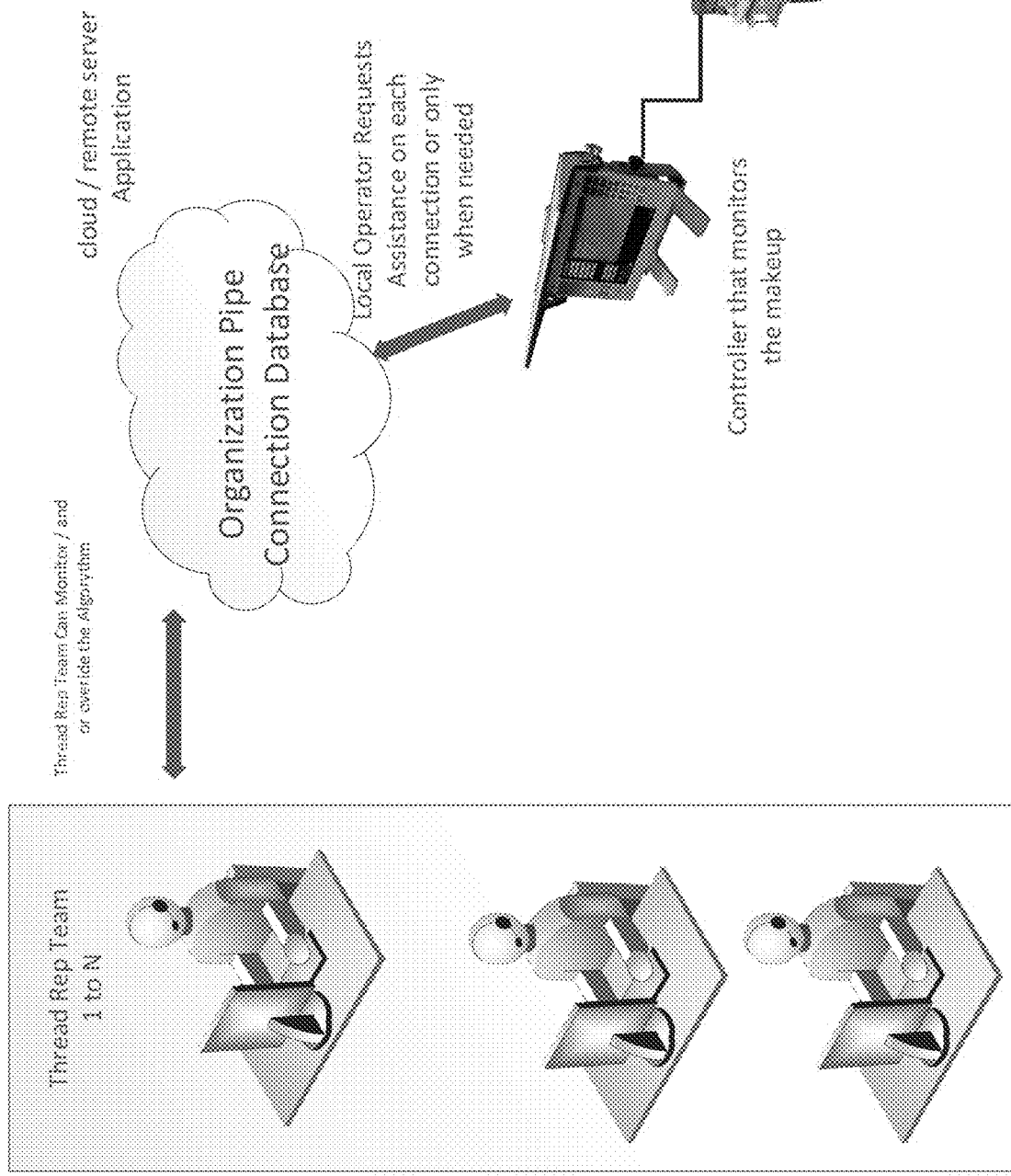
FIG. 4 is a schematic diagram of an example of the present system working with a third party connections expert providing a virtual thread representative service.

With reference to FIG. 4, the present system can further provide connection via the internet in real time to one or more virtual thread representatives who can remotely view connection data as a connection is made up at the job site and advise on proper make-up of the tubular joints. The remote or virtual thread representative can be an expert from the tubular manufacturer, or an internal or external consultant. This can serve to eliminate the need for thread representatives to be physically on site for all make-up operations.

The system further provides hardware and software for allowing a remote team of one or more individuals to view in real time and analyze the make-up operation and provide comments and recommendations to either accept or reject the made up joint. This tool will allow the expert to remotely review and analyze the connection and communicate via chat, text, video or other forms of communication through a thread representative dashboard. Using job cards and a queue system the time sensitive analysis can be completed without interrupting the performance of the make-up operation. This reduces the need for expertise required on site when running tubular make-up.

It is common in completion operations for a senior make-up operator to be on site and supervise a junior on site operator. This practice ensures quality and provides training, but also adds expense, time and complexity, since the senior operator can only provide supervision and support to the single junior operator he or she is working with on site.

The present system provides a means by which the senior operator, working in a single central location, can supervise, advise and even run the make up operations for more than one junior operator in more than one location.

In many cases, a remote operator can conduct the whole make up operation remotely, with only the need for a local technician to make only the preliminary set up. Online job discussion between operators and remote experts captures job events such as make-ups completion, lot changes and official comment during a job, as well as the recorded job statistics and information.

Central Library and Database

Figure 6:
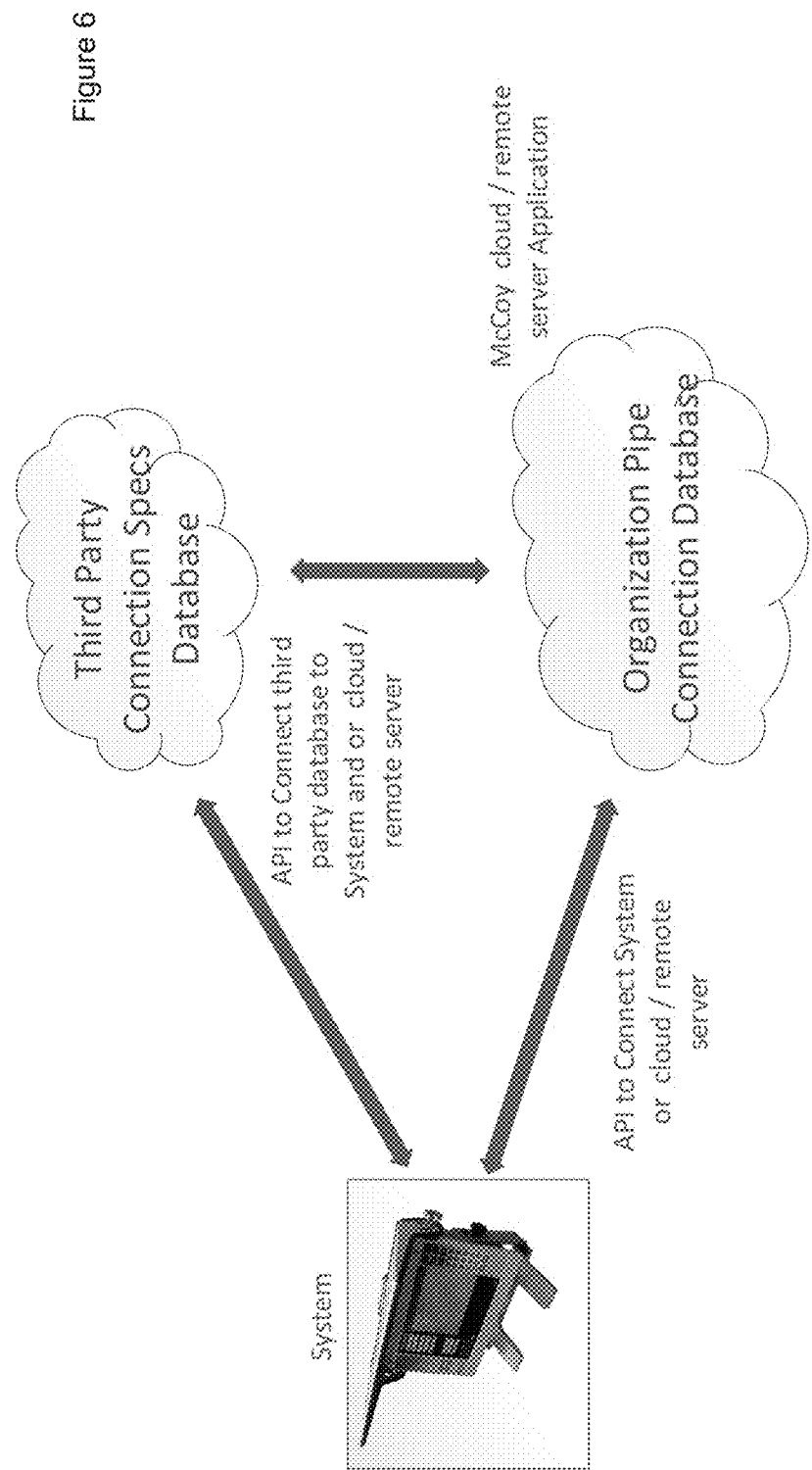
FIG. 6 is an example of an online tubular specifications library and an organization's tubular connection operational database that can be linked to one another and provided as part of the present system.

With reference to FIG. 6, the present system more preferably also contains an accessible central repository of connection profile libraries by which the connection profiles of any particular tubular joints can be loaded as connection criteria ahead of make-up operations. This provides an accessible and loadable database of tubular make-up specifications. The system may also contain a library of system settings for a fleet of tubular make up equipment and operating parameters, as well as historical operational data. The online connection library provides the ability for an organization to create a centralized library of settings for download and synchronizing the torque turns system. This resolves the issue of downloading a datasheet of connection settings and manually entering the values into the system provide a more error proof system.

The system also makes it possible to track response time and proves a multi graph overlay of the last several jobs to review for consistency, over a lot or batch of pipe.

Adaption for Use with Automated Make-Up Algorithms

The present system may also be used with edge or cloud based algorithms that can automate connection make-up. When connection data is analyzed using the present system, it is possible to make use of decision-making algorithms based on statistical modeling and equipment learning with the system to automatically operate the tubular make-up.

Figure 7:
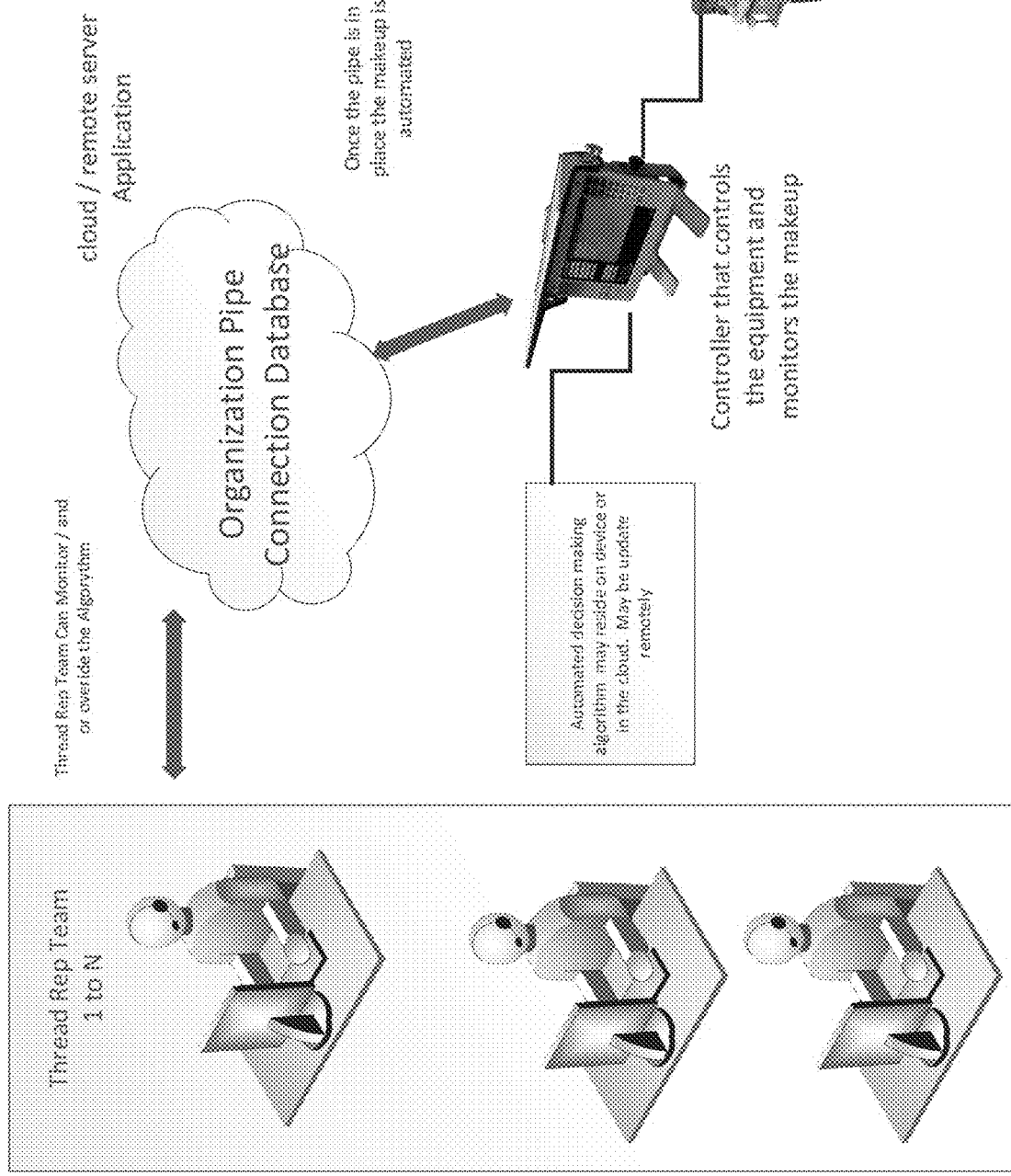
FIG. 7 is a schematic diagram of one example of the present system used with an automated algorithm or remote thread rep or a combination of both.

One example of this use of the system is shown in FIG. 7.

With the present system, remote operation of the tongs, slips and other related parts of the tubular make-up equipment via communication with the on-site make-up monitoring system can in turn provide remote operation of the equipment and can automate torque-turn and calibration evaluation.

Communicating Site Connection Data to Tubular Manufacturers

In a further embodiment, illustrated in FIG. 8, the present system can provide on-site connection data to the tubular manufacturer. Such data can be collated by the tubular manufacturer with tubular/collar identification, factory make up data and other information to synchronize joint make-up data for a particular well bore and to create a complete wellbore construction make-up report that includes all joints in the well. This includes joints that are made in the factory as well as those made on site.

Make-Up Equipment Calibration

In addition, the present disclosure provides a system for monitoring tubular make-up equipment during a joint make-up to inform if the equipment is in calibration during the time of the joint make-up.

Currently most make up equipment facilities such as those for bucking units perform maintenance and calibrations based on time intervals as preventative measure. In traditional systems calibration data and calibration certificates are stored as static data.

Figure 5A:
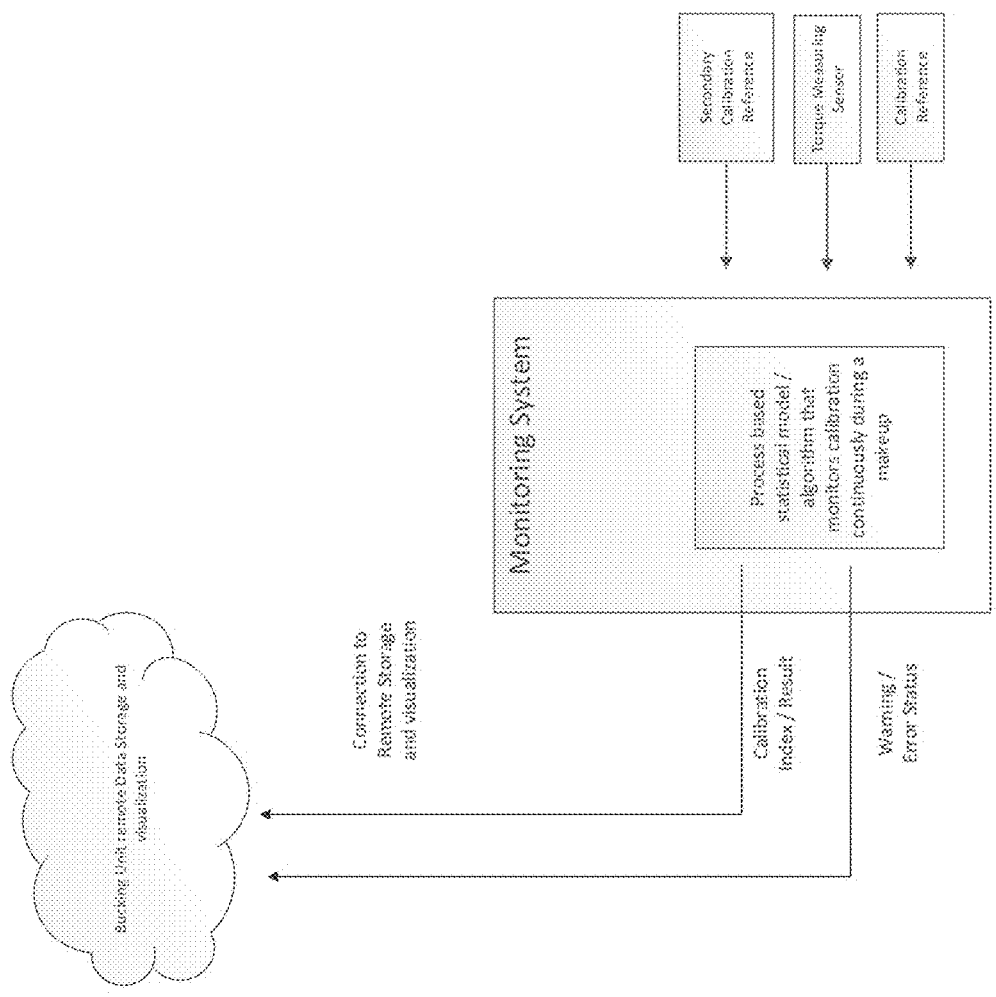
FIG. 5a is a schematic diagram of an example of a bucking unit calibration monitoring aspect of the present system.
Figure 5B:
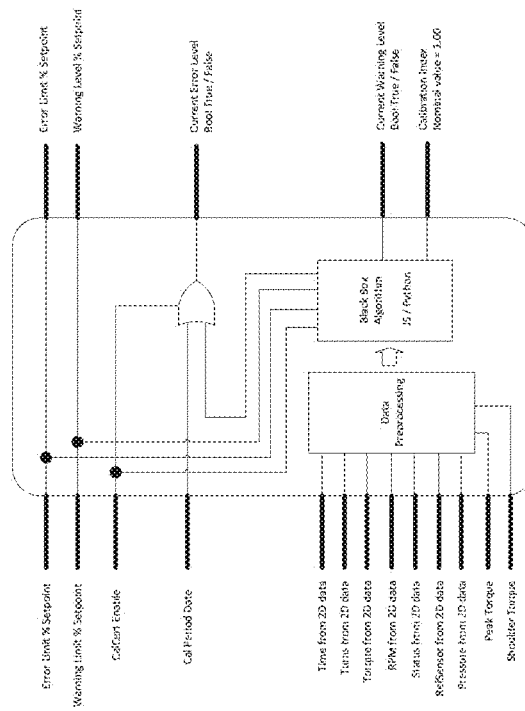
FIG. 5b is a block diagram of one example of a regression model for a bucking unit calibration monitoring aspect of the present system.

With reference to FIGS. 5a and 5b, the present system provides a more predictive model, in which sensor measurements are collected to evaluate make-up equipment's calibration status based on criteria set by equipment manufacturers, operators and tubular manufacturers. In addition to torque and turns sensors used to determine satisfactory make-up, additional sensors may be connected along with edge or cloud based algorithms or models to provide limits or Certainty values that can provide a statistical confidence of the calibration state of the equipment during the joint make-up.

Even when all sensor data is as expected, the present system provides a limit or index to each sensor measurement along with and in addition to the Certainty index of the overall make-up operation. Providing indexes for each measurement adds certainty to each sample. Providing the certainty index as a supporting value on every measurement supports the integrity to each reading/graph/makeup task as it reduces uncertainty from the sensor measurement. This is valuable even when all sensor data look to be correct.

The system can further provide predictive maintenance and predictive calibration of bucking units, yielding higher product performance, higher integrity of make-up—since more information on calibration health is provided, lower maintenance cost and more operational time between maintenance. The present system can utilize the last historical calibration data from a unit, together with connection and operational data to predict when calibration is required.

Data is collected at a frequency applicable to the unit being monitored and more preferably, data frequency is determined as a function of resolution and responsiveness required properly identify machine operational performance. Data is recorded and synched in real time via either a cloud or edge-based network. Access to data can be through the system's multi-platform portal. In one embodiment, the system can be loaded with basic level predictive maintenance calibration algorithms initially and then algorithms can be adjusted and improved as the data and operational models are collected as bucking units are used.

Initially the system uses offline supervised learning and other applied machine learning modeling as a means of determining a level of certainty of calibration and generating a Certainty Index. Extra sensory data is correlated to the primary sensor data and to model equipment behavior to detect changes in system performance around torque calibration.

The initial offline process involves installing and initially calibrating a unit. After some period of data collection, the equipment will be recalibrated or verified to ensure the initial calibration is still valid. A window of data is thereby created that can be used to train and validate the system model. Data can be pulled from the cloud and an offline analysis of the data as well as applied machine learning and validation is completed on a per unit basis. Once the machine learning coefficients are determined, the model is updated and activated to provide an indicator or a warning on each make-up on whether the sensor data does or does not confirm a high certainty that the unit is performing to normals. In an optional embodiment periodic or scheduled calibration can be used to provide additional data to the model.

The overall process can in one embodiment include the steps of: gathering data; pre-processing data; applied machine learning model selection; training the model; evaluating the model and prediction. Other variations to a method of using machine learning to be able to review and provide a level of certainty to sensor and make up data would also be understood to be included within the scope of the present invention.

Data preprocessing is done for all data to help normalize the system and data features.

Data is extracted and then normalized and saved to a new array. Once the predicted output is calculated from the above, it can be compared with the actual measured torque value to find the outcome residual or difference between the actual measured values and the predicted values.

From this an array of outcome residuals can be calculated that can then be compared with predicted residuals to identify if the residuals are within the boundaries of the acceptance criteria of the model. The residuals from each sample within a run can also be compared to create a Certainty index. The Certainty index is set by an error limit % value. The Certainty index is essentially 1=MAPE (Mean Absolute Percentage Error)

Training is then performed on the model in which calibration information is provided to the system and displayed in graphical form with upper and lower limits shown.

An alarm system and a warning system may further be provided at the bucking unit accessible through the portal. The system will alert if the system drifts beyond a certain threshold, notifying the customer via the portal.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A calibration certainty system for increasing certainty in the calibration state of mechanized well operation equipment, comprising:
   i) an on-site make-up monitoring system connected to on-site sensor module of the mechanized equipment, for receiving and processing sensor data; and,
   ii) a cloud or edge-based system connected with said on-site make-up monitoring system and comprising cloud or edge-based calibration certainty algorithms for analyzing sensor data;
wherein the cloud or edge-based calibration certainty algorithms provide a certainty index and limits in connection with the sensor data and make-operation to thereby provide statistical confidence and increased certainty that sensor data align with the calibration state of the equipment during operation.

2. A calibration certainty determination method for increasing certainty of the calibration state of mechanized well operation equipment, comprising:
   i) installing and initially calibrating the equipment
   ii) collecting calibration and operation data from the equipment via an on-site make-up monitoring system
   iii) transmitting said data to a cloud or edge-based system;
   iv) recalibrating equipment to confirm initial calibration validity;
   v) performing via a cloud or edge-based system applied machine learning to validate calibration;
   vi) updating an applied machine learning model with updated machine learning coefficients; and
   vii) activating the model to provide a Certainty Index with respect to calibration state of the well operation equipment operation, wherein the certainty index provides statistical confidence and increased certainty that sensor data align with the calibration state of the equipment during operation.

* * * * *